United States Patent [19]

Murray

[11] Patent Number: 4,599,721
[45] Date of Patent: Jul. 8, 1986

[54] PROGRAMMABLE CROSS BAR MULTIPLEXER

[75] Inventor: Donald F. Murray, St. Helens, Oreg.

[73] Assignee: Tektronix, Inc., Beaverton, Oreg.

[21] Appl. No.: 596,209

[22] Filed: Apr. 2, 1984

[51] Int. Cl.$^4$ .......................... H04J 3/04; G11C 8/02; H03K 17/00; H03K 17/40
[52] U.S. Cl. .................... 370/112; 307/243; 328/104; 340/825.79; 340/825.85; 340/825.88; 364/715; 365/231
[58] Field of Search ............ 370/58, 112, 66, 68; 307/243; 328/104; 179/18 GE, 18 GF, 18 J; 365/231; 364/715, 716; 340/825.79, 825.83, 825.85, 825.86, 825.87, 825.88, 825.89

[56] References Cited

U.S. PATENT DOCUMENTS

| | | | |
|---|---|---|---|
| 3,666,930 | 5/1972 | McDaniel | 307/243 |
| 3,924,079 | 12/1975 | Garrett | 370/66 |
| 4,093,942 | 6/1978 | Suzuki et al. | 340/825.87 |
| 4,245,214 | 1/1981 | Beirne | 179/18 GF |
| 4,409,683 | 10/1983 | Woodward | 370/112 |
| 4,467,439 | 8/1984 | Rhodes | 340/825.87 |

OTHER PUBLICATIONS

R. J. Smith, "Electronics: Circuits and Devices, Second Edition", Wiley, New York, 1980, p. 241.

Primary Examiner—Douglas W. Olms
Assistant Examiner—Wellington Chin
Attorney, Agent, or Firm—John P. Dellett; Robert S. Hulse

[57] ABSTRACT

A cross bar multiplexer includes a plurality of small memory units addressable to indicate combinations of output conductors. The outputs of a plurality of memory units are ORed to provide the outputs for a full array.

9 Claims, 4 Drawing Figures

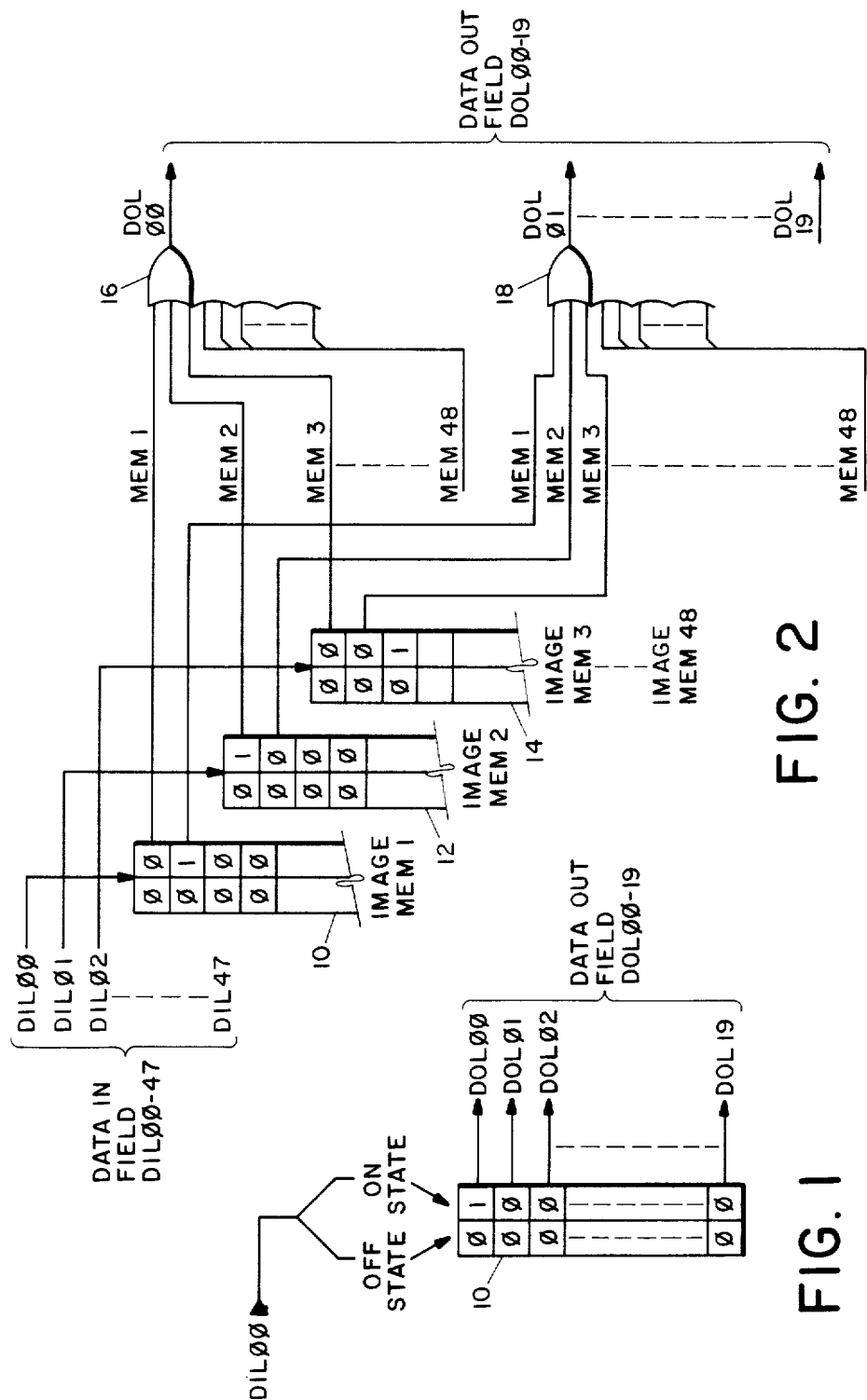

PROGRAMMABLE CROSS BAR MULTIPLEXER

BACKGROUND OF THE INVENTION

The present invention relates to a multiplexer and particularly to a multiplexer for transferring a first large data field to a second large data field under program control.

Large grid matrix decoders or cross bar circuits are common for converting a first array of data connected to a first set of parallel conductors to a plurality of output terminals connected to a second set of parallel conductors orthogonal to the first. Permanent connections or electrically operated gates are interposed between conductors at grid crossings. Although a cross bar multiplexer circuit may be constructed in this manner, the number of component elements required is large when the arrays of conductors are large and the space requirement can become prohibitive.

As an alternative approach, a digital memory can be employed which is addressed via input leads and supplies decoded outputs from addressed memory locations. For instance if multiplexing is required between a forty-eight line input field and a twenty line output field it appears a memory depth of $2^{48} \times 20$ (or $2.81 \times 10^{14} \times 20$) would be required to allow any combination from the forty-eight line input field to cross over to the twenty line output field. A memory of this size would be overly expensive and would require excessive time to load.

SUMMARY OF THE INVENTION

In accordance with the present invention in a particular embodiment thereof, a programmable multiplexer comprises an array of addressable memory units for receiving address inputs from a plurality of input lines and for providing crossover outputs on a plurality of output lines. In a preferred embodiment, ones of said memory units are responsive to subgroups of the input lines, and each stores, for retrieval, the possible combinations of output terminal activation corresponding to its input line activation. Memory output terminals of like bit significance are ORed to provide the output line decoding. Much less space is required for this multiplexing system than for the suggested alternatives and the decoding operation is comparatively rapid.

It is accordingly an object of the present invention to provide an improved programmable multiplexer which is economical in parts requirements and rapid in operation.

It is another object of the present invention to provide an improved programmable multiplexer which is compact but capable of interconnecting relatively large numbers of input and output conductors.

It is a further object of the present invention to provide an improved multiplexer for connecting input and output field in a readily programmable manner.

The subject matter of the present invention is particularly pointed out and distinctly claimed in the concluding portion of this specification. However, both the organization and method of operation of the invention, together with further advantages and objects thereof, may best be understood by reference to the following description taken in connection with the accompanying drawings wherein like reference characters refer to like elements.

DRAWINGS

FIG. 1 is a first explanatory drawing illustrating a portion of a multiplexer according to the present invention, FIG. 2 is a block diagram of one form of the multiplexer according to the present invention, FIG. 3 is a block diagram of a preferred form of a multiplexer according to the present invention, and FIG. 4 is a more detailed block diagram of a portion of the FIG. 3 multiplexer.

DETAILED DESCRIPTION

Figure 3:
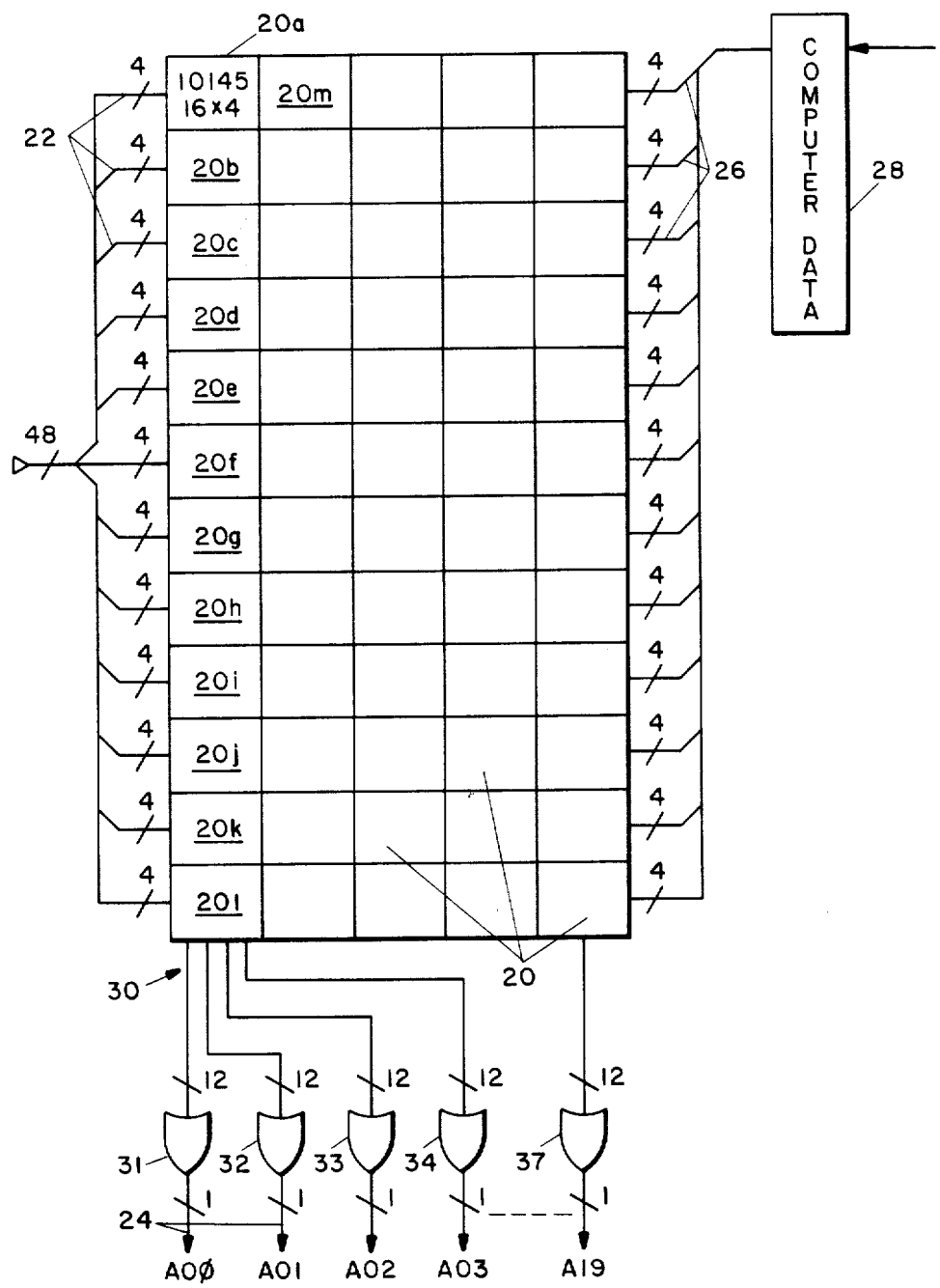

A cross bar multiplexer allows any data line of a data-in field to provide an equivalent logic state copy of itself (possibly ORed with other data-in lines) on any single line or on multiple lines of the data-out field. Consider a simple example wherein data-in lines are numbered 1 through 7, and data-out lines are similarly numbered 1 through 7. As hereinbefore mentioned, the data-in lines may be considered as extending in a first parallel direction while the data-out lines may be considered as extending in a second direction orthogonal to the first, with interconnection being made at any desired crossover. In a specific example, the data-in line number 1 may be connected to the data-out lines 1, 3 and 7. At the same time the data-in line 7 may also be connected to the data-out line 7. Any other combination of connections from the data-in lines to the data-out lines should be possible.

Although constructing a memory embodiment responsive to any combination of input lines for indicating crossover to any output line would appear to require a large memory size, the size may be reduced considering that a given input line, when energized, will always define a given data-out field image. Referring to FIG. 1, a memory 10 is responsive to only one input line here designated DIL $\phi\phi$. The memory has a minimum address depth of two, one for the input-on state and one for the input-off state, and stores a plurality of bits for output on data-out field lines designated DOL $\phi\phi$ through DOL 19. The memory 10 is illustrated as loaded with a one in the first bit position i.e. at at the DOL $\phi\phi$ data-out field bit position, and with zeros loaded into the remaining locations. This would map a one from the DIL $\phi\phi$ data-in line to the DOL $\phi\phi$ data-out line, assuming the DIL $\phi\phi$ line is in the true state.

To expand the data-in field requires an additional image memory as illustrated in FIG. 1 for each data-in line. The complete data-out field then comprises a combinational "OR" of the images of the data-out field in each of a plurality of image memories. Referring to FIG. 2, a first image memory 10 is illustrated as responsive to the DIL $\phi\phi$ line of the data-in field, an image memory 12 is responsive to input line DIL 01 input line, and an image memory 14 is responsive to input line DIL 02. The first or top bit position of image memory 10 is coupled, on read-out, to OR gate 16. Similarly, the top or first bit position of image memory 12 is input to the same OR gate, and likewise the first or top bit position of image memory 14 is coupled to OR gate 16. OR gate 16, which provides an output designated DOL $\phi\phi$, also receives input from the first bit position of a remaining plurality of image memories, totaling one input for each of forty-eight data-in lines.

A second OR gate 18 receives input from the second bit position of each of the image memories 10, 12 and 14, as well as from the second bit position of each of the remaining image memories, and supplies the output line signal designated DOL $\phi$1. Of course, subsequent OR gates are provided, one for each output line, and each receives inputs from corresponding positions in the image memories. The ORing enables access of any line in the forty-eight bit input addressing field to any single line in the output field. FIG. 2 shows DIL $\phi\phi$ being mapped into DOL $\phi$1 and DIL $\phi$1 mapped into DOL $\phi\phi$.

The data-output field in the specific example comprises twenty output lines designated DOL $\phi\phi$-19, with the minimum width of each image memory being equivalent to that of the data-output field. By pre-formatting the contents of the forty-eight (2×20) memories, any cross bar configuration from the forty-eight line input field to the twenty line output field may be accomplished in real time.

The embodiment of FIG. 2, while workable and requiring minimum memory size (96×20 bits), does have certain disadvantages. Few manufacturers provide memory elements with a width which is greater than their depth, and also obtaining an "OR" function which is as wide as the data-in field (i.e. forty-eight in the particular example) would require excessive capacitive loading and/or gate delay. Therefore, the embodiment of FIG. 3 is preferred.

The embodiment of FIG. 3 employs additional memory space in order to lower the number of external "OR" functions. The additional memory space is loaded with data to provide external "OR" functions internal to the memory. A plurality of image memories generally indicated at 20 are depicted as arranged in columns (vertical in FIG. 3) and rows (horizontal in FIG. 3) wherein the image memories of a particular row have address terminals connected to the same four of the data-in lines 22. In the specific example, forty eight input lines are selectively cross-connected by the apparatus according to the present invention to twenty output lines, A$\phi\phi$ to A19, illustrated at 24 in the drawing.

Each of the memory units 20 is suitably a conventional type 10145, 16×4 random access memory, i.e. having four address line (indicated at the left) for addressing sixteen possible memory locations, and four data-out lines which are connected as herinafter more fully described. Each memory 20 also receives four data-in lines 26 from computer data source 28 used in formatting the memory system to provide the desired crossover pattern. This pattern can be stored in the memory units at computer speed.

Each memory unit 20 is the illustrated example of FIG. 3 stores, for retrieval, the possible combinations of output terminal activation corresponding to the possible combinations of input address terminal activation as received from a particular group of four input lines. Thus, considering the upper left hand memory unit 20a in FIG. 3, four of the input address lines 22 are used to address sixteen locations in the upper left hand memory unit 20a, wherein each location stores a possible combination of four output lines. It will be seen the proper output line activation schedule can be provided for any possible combination of activation of the four top input address lines. Similarly, the next memory unit 20b in the same column receives four addressing inputs from a next group or series of four input lines, and in response to their activation provides the retrieval of sixteen possible combinations of output line activation.

The four outputs for each of the memory units 20a through 20l in the same column are collected by means of OR gates 31-34 wherein, for example, the lowest order output for each of the memory units 20a through 20l provides one of twelve inputs to OR gate 31. Similarly, the next higher order bit output of each of the memory units 20a through 20l is supplied to OR gate 32, the next more significant bit output from each of the memory units is input to OR gate 33, and finally, the most significant output from each of the left hand column memory units is connected to OR gate 34. The OR gates 31-34 supply the output line indications designated A$\phi\phi$ through A$\phi$3, and it will be recognized the outputting arrangement corresponds to that described in connection with OR gates 16 and 18 in FIG. 2. The difference, however, is that substantially fewer inputs are applied to each OR gate, i.e. twelve rather than forty-eight as in the FIG. 2 embodiment. Consequently a more workable and practical structure is achieved. At the same time, the memory structure is within reason in that it does not have to satisfy the requirement of storing all possible output configurations (of twenty lines) for all possible input configurations (of forty-eight lines) in order to provide immediate access, but rather the outputs for a column of smaller conventional memory units are ORed as indicated to secure simultaneous access therefrom.

The system as thus far described supplies only the activation configuration for four of the output lines 24 in response to any combination of the forty-eight input lines 22. The remaining vertical columns of memory units 20 in FIG. 3 are connected to further OR gates, for example the most significant data-out bits of each of the right hand column memory units are individually connected as the twelve inputs of OR gate 37 to provide the A19 output line indication.

Figure 4:
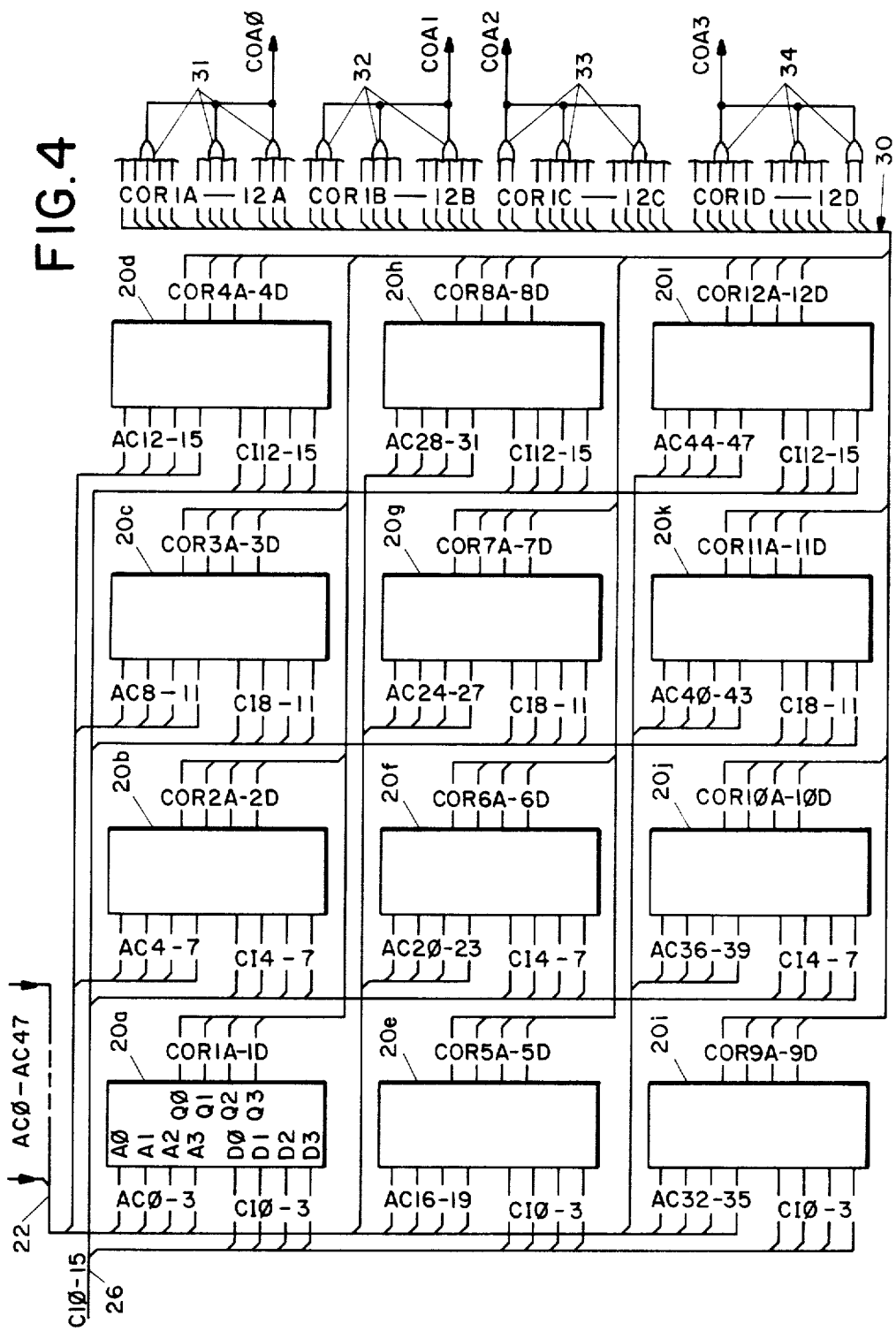

Referring to FIG. 4, illustrating a portion of the FIG. 3 memory system in greater detail, a particular "column" of memory units 20a through 20l is shown. The memory units are addressed by the AC$\phi$-AC47 data-in lines 22 and it will be observed the data-in lines are connected by groups of four to addressing inputs of the successive memory units. Thus, data-in lines AC$\phi$ through AC3 are connected to address inputs A$\phi$ through A3 of memory unit 20a, data input lines AC4 through AC7 are connected to address inputs of memory unit 20b, etc. The COR data-out 30 are connected as inputs to OR gates 31, 32, 33, and 34, wherein each of these OR gates actually comprises three component units having their outputs tied together to provide one of the output line indications COA0 through COA3. It will be observed that the four data outputs Q$\phi$ through Q3 of memory unit 20a are provided on output connections COR1A through COR1D that lead respectively to OR gates 31, 32, 33 and 34. Similarly, the four corresponding outputs of memory unit 20b are provided on output leads COR2A through COR2D also repectively coupled to the OR gates 31, 32, 33 and 34, wherein corresponding bit positions are connected to the same OR gates. Thus, the Q0 outputs are ORed together, the Q1 outputs are ORed together, the Q2 outputs are ORed together and the Q3 outputs are ORed together. The output connection scheme is repeated for the rest of the memory matrix.

Furthermore, data-in lines 26 are connected, as indicated, to the data-in lines D0 through D3 of each of the memory units via connections CI$\phi$ through CI15 as shown. These inputs are utilized for storing the connection crossover information into the memory system in the first place, and this configuration can be reformatted at computer time.

The construction as illustrated in FIG. 4 is repeated for each of the five columns of the memory system as depicted in FIG. 3 wherein successive columns supply each sequence of four outputs of the total output field A$\phi\phi$ through A19. It is noted the embodiment of FIGS. 3 and 4 requires only one level of gate "ORing" which, in addition to the time required for memory access, provides a reasonably fast, "real-time" cross bar. The space requirements are not excessive, and the entire multiplexer can be accommodated on one circuit board as compared with four or five circuit boards in the case of a circuit including gate means at each intersection of a conventional decoding matrix. Furthermore, the present system is does not employ a large memory for storing all possible output line configurations for all combinations of input line activation, but instead utilizes a small number of conventional, small, readily available memory units.

While preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A programmable multiplexer comprising:
   a plurality of input terminals for receiving address inputs,
   a plurality of output terminals,
   a memory system including an array of addressable memory units each receiving a portion of said address inputs from a different series of said input terminals and each memory unit storing, for retrieval, numbers representing the combinations of output terminal activation corresponding to combinations of input terminal activation from the series of input terminals applied to that memory unit,
   and means for ORing corresponding accessed outputs of like numerical significance of said addressable memory units as represent different series of input terminals to provide outputs for said array at said output terminals.

2. The multiplexer according to claim 1 including means for selectively entering said numbers representing output terminal activation information into said memory units.

3. A programmable multiplexer comprising:
   a plurality of input lines,
   a plurality of output lines,
   a number of memory units, addressed by consecutive groups of said input lines, said memory units each having plural outputs upon which addressed information is accessed,
   and plural OR gate means each adapted to receive the outputs from several of said memory units, wherein said outputs applied to a particular OR gate means read out stored information bits of like significance, said OR-gate means respectively providing their logical results to said output lines.

4. A programmable multiplexer comprising:
   a plurality of input lines,
   a plurality of output lines,
   plural memory means responsive to input line addressing for providing crossover information as data outputs,
   plural OR-gate means each supplying an output coupled to a said output line,
   and means coupling data outputs of plural memory means, as represent correspondingly ordered bits of like significance of crossover information, to the respective OR-gate means.

5. A programmable multiplexer comprising:
   a plurality of input lines divided into groups,
   a plurality of output lines,
   plural memory means for storing crossover information wherein each memory means is provided with addressing inputs responsive to a different group of said input lines and data outputs for presenting ordered crossover information,
   plural OR-gate means each supplying an output coupled to one of said output lines,
   and means coupling the data outputs of the plural memory means, as represent correspondingly ordered bits of crossover information, as inputs to individual OR-gate means.

6. The multiplexer according to claim 5 including further memory means for storing additional crossover information, said multiplexer including additional output lines,
   said further memory means being addressed by the same input lines as address the said plural memory means,
   additional OR-gate means each supplying an output to one of said additional output lines,
   and means coupling the data outputs of said further memory means, as represent correspondingly ordered bits of crossover information, to said additional OR-gate means.

7. The multiplexer according to claim 5 including means connected to said memory means for selectively entering crossover information into said memory means 8. A programmable multiplexer comprising:
   a plurality of input terminals of predetermined order, from an input terminal adapted to receive the most significant bit of an input number to an input terminal adapted to receive the least significant bit of said input number,
   said input terminals being subdivided into groups for receiving adjacent bits of said input number,
   a plurality of output terminals of predetermined order, from an output terminal adapted to provide the most significant bit of an output number, to an output terminal adapted to provide the least significant bit of an output number,
   said output terminals being subdivided into groups for providing adjacent bits of said output number,
   a matrix of memory means electrically interconnected in rows and columns, wherein the memory means of each row are connected to receive a common address from a said group of said input terminals, and wherein each column of memory means is adapted to provide read-out data for a said group of said output terminals, and
   a group of OR-gates interposed between the data outputs of the memory means in a given column and the said group of output terminals to which the memory means of that column are adapted to provide read-out data, wherein the inputs of a single OR-gate of said group of said OR gates are connected to receive corresponding bit outputs from data outputs of memory means in said given column, and wherein the output of said single OR-gate is coupled to a said output terminal.

9. A programmable multiplexer comprising:
a plurality of input terminals electrically disposed in predetermined order, from an input terminal adapted to receive the most significant bit of an input number, to an input terminal adapted to receive the least significant bit of said input number,
said input terminals being subdivided into groups connected to receive successive adjacent bits of said input number,
a plurality of output terminals electrically disposed in predetermined order, from an output terminal adapted to provide the most significant bit of an output number, to an output terminal adapted to provide the least significant bit of an output number,
said output terminals being subdivided into groups for providing successive adjacent bits of said output number,
a matrix of multibit random access memories electrically interconnected in rows and columns, wherein the random access memories of each row are connected to receive a common address from a said group of said input terminals, and wherein each column of random access memories is adapted to provide read-out data for said group of said output terminals,
a group of OR-gates interposed between the data outputs of the random access memories in a given column and the said group of output terminals to which the random access memories of that column are adapted to provide read-out data, wherein the inputs of a single OR-gate of said group of OR gates are connected to receive bit outputs of like significance from data outputs of random access memories in the given column, and wherein the output of said single OR-gate is coupled to a said output terminal supplying and output of the same bit significance, and
means for entering digital information into said random access memories for read-out as an output number on said output terminals in response to said multiplexer being addressed on said input terminals by said input number.

* * * * *